United States Patent Office 3,181,990
Patented May 4, 1965

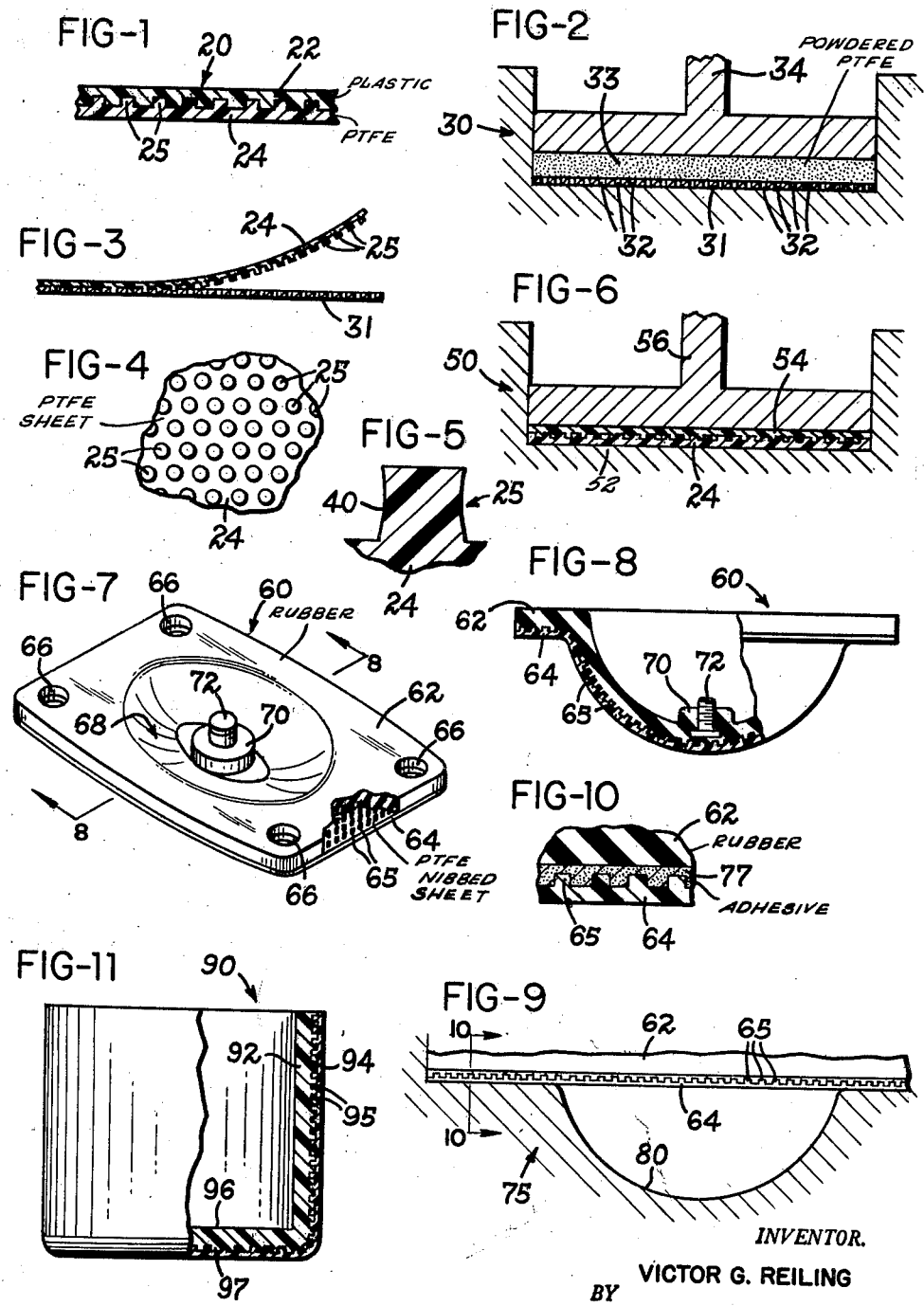

3,181,990
SINTERED PLASTIC ARTICLES
Victor G. Reiling, Dayton, Ohio, assignor to The Duriron Company, Inc., Dayton, Ohio, a corporation of New York
Filed Dec. 30, 1960, Ser. No. 79,764
6 Claims. (Cl. 161—119)

This invention relates to the fabrication of laminated members of a sintered plastic material.

Fluorocarbon polymers which are available commercially in powdered form, such as tetrafluoroethylene resins sold under the trademark Teflon, may be fabricated into articles by performing under pressure to compact the powder to the desired shape followed by sintering or baking at a relatively high temperature to produce a finished product. These sintered plastics have excellent bearing properties even in the absence of a lubricant, any they have the additional advantage of being highly inert and are therefore useful for sealing purposes, particularly where corrosive materials are involved. However, they also have a definite tendency to cold flow under load, especially at elevated temperatures, and the resulting changes in shape and dimensions affect their utility in structural members.

It is a primary object of this invention to provide a structural member in the form of a laminated article wherein a relatively thin sheet of plastic material is secured to and maintained in intimate contact with a flexible backing member in such a manner as to provide an interlocked unitary structure which is stable after continued and repeated flexing.

This primary object of the invention has been successfully accomplished by the combination of a sintered plastic material of the type described above with a flexible backing member having a multiplicity of apertures in one surface thereof which receive in interfitting relation a corresponding number of locking nibs provided on the surface of a relatively thin sintered plastic member. Cooperating with the locking nibs and the apertures is an adhesive which is employed to assist in maintaining the plastic member in intimate contact with the flexible backing member. With this arrangement of locking nibs, apertures, and an intermediate adhesive, it is possible to maintain the plastic sheet and the flexible backing in intimate contact after repeated flexings of the composite laminate.

It is therefore an object of this invention to provide a flexible article having a relatively thin sintered plastic member mechanically and chemically bonded to a flexible backing member.

An additional object of this invention is to provide laminated sintered plastic article of the type described above which may be formed into various shapes including spherical and cylindrical, for example, and wherein the sintered plastic material is maintained in intimate contact with a flexible backing member by a bond of uniform strength throughout the entire contacting surfaces of the laminate.

Another object of this invention is to provide a method of fabricating a laminated sintered plastic article as outlined above wherein a sintered plastic member provided with a multiplicity of locking nibs on one surface thereof is simultaneously bonded to a flexible backing member while the composite structure is molded into the desired configuration.

Still another object of this invention is to provide a method of fabricating a sintered plastic article as outlined above wherein a sintered plastic member is secured to a rubber backing member by placing a layer of uncured rubber in contact with a nibbed sintered plastic member and subsequently, in a single operation, bonding the rubber to the plastic member, curing the rubber and molding the composite structure to a desired configuration.

A further object of the present invention is to provide a diaphragm member wherein a sintered plastic material which includes a multiplicity of locking nibs projecting from the backing surface thereof is secured to a rubber backing member and wherein an adhesive is employed which cooperates with the locking nibs to provide a bond between the rubber member and the sintered plastic which is uniform throughout the areas of contact between the rubber and plastic members.

Other objects and advantages of the invention will be apparent from the following description, the accompanying drawings and the appended claims.

In the drawing—

FIG. 1 is a view in section of an article produced in accordance with this invention and comprising a flexible backing member bonded to a sintered plastic member;

FIGS. 2 and 3 are somewhat diagrammatic views illustrating successive steps in the fabrication of the nibbed sintered plastic member;

FIG. 4 is a plan view on an enlarged scale of the nibbed surface of the sintered plastic member;

FIG. 5 is a view in section on an enlarged scale of one of the nibs shown in FIG. 4;

FIG. 6 is a somewhat diagrammatic view of the final step of the fabrication of the article shown in FIG. 1;

FIG. 7 is a view in perspective, with parts thereof broken away, of a diaphragm member fabricated in accordance with the present invention;

FIG. 8 is a view partly in section and partly in elevation taken generally along the line 8—8 of FIG. 7;

FIG. 9 is a somewhat diagrammatic view illustrating the final step in the fabrication of the diaphragm member shown in FIG. 7;

FIG. 10 is an enlarged sectional view taken generally along the line 10—10 of FIG 9; and FIG. 11 is a view in perpsective, with parts thereof broken away, of a resilient cup-shaped member having an outer surface of sintered plastic material in accordance with the invention.

Referring to the drawing, which illustrates a preferred embodiment of the present invention, the article 20 shown in FIG. 1 includes a flexible backing member 22 of rubber or flexible thermoplastic or thermosetting material bonded to a layer 24 of sintered plastic material by means of a multiplicity of nibs 25 or integral projections which are seated in a corresponding number of apertures formed in one surface of the backing member.

FIGS. 2, 3 and 6 illustrate in schematic fashion the steps involved in fabricating the article of FIG. 1, which include forming a nibbed sheet of Teflon, degrading the nibbed surface of the sheet to provide a wettable surface which is receptive to an adhesive, and simultaneously curing and bonding a flexible backing member and to the sintered plastic member.

The initial step in fabricating the nibbed sheet 24 involves placing in the bottom of a suitable mold 30 a metal plate 31 having multiple perforations 32 therein, and then adding the powdered resin material 33 until a layer of sufficient thickness is present, depending on the desired thickness of the sheet. The plunger 34 is then actuated to preform the powder 33 by compaction within the mold which reduces the thickness of the composite materials as much as 4–6 to 1. The resulting preformed composite article is then subjected to the proper elevated temperature to effect sintering of the compact powder, and an appropriate temperature being in excess of 620° F. in the case of the Teflon material noted above.

Subsequent to the sintering operation, the nibbed plastic sheet 24 is stripped away from the perforate metal plate 31, as shown in FIG. 3, to provide a sintered plastic member having a plurality of nibs formed on one surface thereof as shown in FIG. 4. The locking nibs 25, which are in the form of integral projections on one surface of the sintered plastic member, are preferably formed in parallel rows with the nibs of one row evenly spaced from the nearest two nibs of the adjacent row. The number of nibs per square inch should be such that a sufficient portion of the non-nibbed surface is exposed for bonding and with a sufficient number of nibs to provide good adhesion with the flexible backing member. As an illustration and in no way to be construed as a limitation, there may be from about 80 to 160 or more nibs per square inch, with the average nib diameter at the base thereof ranging from about less than $1/16$ to $1/8$ inch or more.

One aspect of this invention relates to the nib configuration which serves to provide more efficient bonding. Referring to FIG. 5, it can be seen that the nib 25 is thinner at its midsection 40 than at either end thereof. The reason for such nib configuration can be understood with reference to the sheet forming techniques and the characteristics of the powdered starting material as now explained.

In forming the sheet 24, there is a greater thickness of powder in each area overlying one of the perforations 32 (FIG. 2) than in the areas overlying the imperforate portions of metal plate 31. Since the powdered material possesses a substantial resistance to lateral displacement, the result is that during the preforming step, the powder is more highly compacted in the portions or layer overlying the imperforate portion of the plate 31 than in the portions overlying the perforations 32, as is more fully explained in my copending application Serial No. 724,686, filed March 28, 1958, now Patent No. 2,976,093, and assigned to the same assignee as the present case.

The differential compacting which occurs during the preform operation in addition to establishing a density differential, as was described in the above mentioned copending application, also forces the powdered material into the apertures 32 in such fashion as to cause the density of each nib to be greater in the tip portion and base than in the area approximately in the midsection of the nib. Further, the density of the sintered plastic overlying the imperforate areas of plate 31 is greater than the density of the material overlying and filling the perforations 32. Accordingly, as the sintered plastic sheet 24 is stripped or removed from the perforate plate 31, the individual nibs tend to expand along the tip portion to provide a nibbed configuration wherein each nibbed portion is thinner in cross-section at the middle portion thereof than at either end.

The nibbed plastic sheet fabricated as above described may be bonded to a flexible backing member, and the composite assembly cured or formed into the desired configuration in a single step operation. In order to provide a chemical bond, the nibbed surface of the plastic member is pretreated to improve the wettability or the receptivity of the surface to the adhesive. One such method of pretreating the sintered plastic material includes exposure of the nibbed side of the plastic sheet to a solution of sodium in anhydrous liquid ammonia for a period of time sufficient to cause degradation of the nibbed surface as indicated by the change in color thereof from milky white to dark brown.

Subsequent to treatment of the nibbed surface, the sintered plastic sheet 24 is placed in a mold 50 as shown in FIG. 6 with the smooth side of the sheet contacting the base 52 of the mold. The adhesive may be applied before or after the plastic sheet is placed in the mold, although it is preferred that the adhesive be applied prior to inserting the plastic sheet 24 into the mold, since this facilitates the application of the adhesive. Thereafter, an uncured thermoplastic or thermosetting material 54, such as rubber or any of the well known plastics capable of providing a flexible backing is placed over the sheet 24. Pressure is applied by the plunger 56 and the mold heated to a temperature sufficient for simultaneously curing the uncured material 54, causing adhesion between the sintered plastic sheet 24 and the material 54 and forming the composite structure into the desired shape. The resulting article is then removed from the mold to provide a flexible laminate having a sintered plastic facing as described in connection with FIG. 1.

The number of nibs per square inch, the diameter, and the length of each nib are selected so as to provide a strong bond between the sintered plastic sheet 24 and the backing member 22. The thickness of the non-nibbed portion of the sheet 24 may be varied with the desired need, and in accordance with this invention it is possible to provide a laminated article having a plastic sheet 24 which is 0.030 inch in thickness securely and permanently fastened to a flexible backing member 22. It is also possible in accordance with the present invention to fabricate articles having a sintered plastic sheet of several inches thickness secured to a backing member.

A further advantage accruing from the use of a nibbed sheet fabricated as above described results from the significant increase in total surface area provided by the additional surface area of each nib. Such additional surface area is effectively utilized in accordance with the present invention by employing an adhesive which is placed on the surface of the nibbed sheet prior to fabricating the finished product. This increased surface area provided by the presence of the multiplicity of projections on the one surface of the sintered plastic sheet, in addition to providing a mechanical bond, also increase the surface exposed for chemical and adhesive bonding. Thus the strength of the bond achieved through the use of an adhesive and a nibbed sheet is greater than that possible by merely affixing a non-nibbed plastic sheet to a backing member.

One aspect of this invention concerns the formation of laminated articles having a surface or a portion of a surface which is contoured. Referring to FIGS. 7 and 8, a diaphragm member 60 of generally rectangular shape is shown as including a flexible backing member 62 and a sintered plastic member 64 having nibs 65 thereon. A plurality of holes 66 are provided, one at each corner of the diaphragm for securing the diaphragm in position. While the diaphragm 60 is shown of generally rectangular configuration, it is understood that it may be of any shape or size, as is well known in the art.

Positioned in the center of the dished portion 68 of the diaphragm is a boss 70 which serves to anchor a threaded stud 72 to the diaphragm, thus permitting the diaphragm body to be moved relative to the seat upon which it is fixed. If desired, the flexible backing member 62 may be provided with a fabric reinforcing layer therein, as is well known in the art. The provision of the multiplicity of nibs 65 and the use of an adhesive as already described serves to secure the flexible backing member 62 to the sintered plastic member 64 by an exceptionally stable and strong bond, especially in the curved portion of the diaphragm.

The dished portion 68 of the diaphragm is of a spherical shape, and the nibs 65 are arranged so that they are substantially perpendicular to the surface, in the case of a planar surface, or approximately perpendicular to the tangent at the point of contact between the plastic sheet and the backing member in the case of a curved surface. Thus, as force is applied in a vertical direction, by pulling on the stud 72, the nibs 65 which are disposed in a plane perpendicular to the vertical rather than perpendicular to the horizontal, serve to maintain the backing member and the plastic member in a bond tightly together.

Any tendency of the nibs in the horizontal plane to separate from the backing member, for example those nibs below the boss 70, is reduced by the provision of the dove-tail lock arrangement described in connection with FIG. 5.

In the fabrication of the diaphragm 60, a planar sheet 64 of sintered plastic is placed in a mold 75 with the smooth surface of the sheet facing downward to expose the nibs 65, as shown in FIGS. 9 and 10. Thereafter, a layer 77 of adhesive is applied to the nibbed surface of sheet 64, although it is understood that the adhesive may be applied prior to placing the sheet 64 in the mold. A sheet 62 of uncured material, such as rubber or the like is then placed on the adhesive coated plastic layer. The stud 72 is placed on the surface of the uncured sheet 62, and the composite assembly is heated while pressure is applied to form the dished portion 68 of the diaphragm by causing the material to move into the mold cavity 80. In this single operation, the layer 62 is cured and caused to adhere to the plastic layer 64 while the composite assembly is formed into the desired configuration.

The advantages of having a portion of the nibbed sheet arranged in a plane parallel to the direction of the applied force may be more clearly understood with reference to FIG. 11, which shows a cup-shaped member 90 adapted to be employed as a flexible, yieldable, self-lubricating piston in pumps handling air or corrosive materials.

Surrounding and bonded to an inner flexible backing member 92 is a sintered plastic member 94 having a multiplicity of locking nibs 95 which penetrate into the backing member 92 and cooperate with a suitable adhesive to provide a uniform and efficient bond between the two members. The piston 90 may be affixed to a piston rod by a stud (not shown) positioned on and secured to the inner face 96 of the base portion 97.

The piston 90 normally moves in reciprocating fashion since the force is applied parallel to the plane of its cylindrical wall, and thus the majority of the nibs 95 are disposed in a plane parallel to the direction of the applied force, and extend inwardly perpendicular to the direction of such applied force. With this arrangement of the majority of the nibs 95 in relation to the direction of applied force, it can readily be understood that there is little tendency of the nibs along the cylindrical wall of the piston to separate from the backing member 92. As to the base portion 97, the dove-tail configuration of the nibs, and the presence of an adhesive serve to reduce the possibility of separation of the flexible backing member and the plastic member.

If desired, the thickness of the backing member 92 in the area of the base 97 may be substantially increased so that the effects of the applied force are taken up by backing member 92, and little if any force is exerted at the interface of the backing member and the plastic member along the base portion 97. In the alternative, the plastic member may be secured to a solid elastic compressible plug by molding the nibbed sheet into desired shape, and subsequently, in a single operation curing the plug and causing it to adhere to the sintered plastic member.

While the methods and articles herein described constitute preferred embodiments of the invention, it is to be understood that the invention is not limited to these precise methods and articles, and that changes may be made therein without departing from the scope of the invention which is defined in the appended claims.

What is claimed is:

1. An article of manufacture comprising a resinous plastic backing member and an overlying member of polytetrafluoroethylene mechanically and adhesively bonded thereto, said polytetrafluoroethylene member having a relatively low coefficient of friction and being relatively chemically inert, means defining a multiplicity of apertures over substantially the entire surface of said resinous plastic backing member which faces said polytetrafluoroethylene member, said apertures in said resinous plastic backing member having a depth less than the cross-sectional thickness dimension of said resinous plastic backing member, a multiplicity of projections over substantially the entire surface of said polytetrafluoroethylene member facing said resinous plastic backing member and received by the apertures in the surface of said resinous plastic backing member, said projections having a density at the tip and base thereof greater than that at the midsection, each said projection having a cross-sectional dimension at the midsection which is less than that at the tip and base thereof, and an adhesive interposed between the facing surfaces of said members, said projections and apertures cooperating with said adhesive to provide a mechanical and chemical bond maintaining the facing surfaces of said members in intimate contact throughout the entire extent of facing contact thereof.

2. An article of manufacture comprising an elastomeric plastic backing member and an overlying member of polytetrafluoroethylene plastic material mechanically and adhesively bonded thereto, said polytetrafluoroethylene plastic material having a relatively low coefficient of friction and being relatively chemically inert, means defining a multiplicity of apertures over substantially the entire surface of said elastomeric plastic backing member which faces said polytetrafluoroethylene plastic member, said apertures in said elastomeric plastic member having depth less than the cross-sectional thickness dimension of said elastomeric plastic member, a multiplicity of nibs over substantially the entire surface of said polytetrafluoroethylene member facing said elastomeric plastic member and received by the apertures in the surface of said elastomeric plastic member, said nibs having a density at the tip and base thereof greater than that at the midsection, each nib having a cross-sectional dimension at the midsection which is less than that at the tip and base thereof, the density of the portion of said polytetrafluoroethylene member between said nibs being greater than the density in the portion thereof overlying said nibs, and an adhesive interposed between the facing surfaces of said elastomeric plastic and polytetrafluoroethylene members, said nibs and apertures cooperating with said adhesive to provide a mechanical and chemical bond maintaining the facing surfaces of said members in intimate contact throughout the entire extent of facing contact thereof.

3. An article of manufacture as set forth in claim 2 wherein said elastomeric backing member is rubber.

4. A diaphragm comprising a flexible and resilient resinous plastic backing member and an overlying member of polytetrafluoroethylene mechanically and adhesively bonded thereto, said polytetrafluoroethylene material having a relatively low coefficient of friction and being relatively chemically inert, means defining a multiplicity of apertures over substantially the entire surface of said resilient resinous plastic backing member which faces said polytetrafluoroethylene member, said apertures in said resilient resinous plastic member having a depth less than the cross-sectional thickness dimension of said resilient resinous plastic backing member, a multiplicity of projections over substantially the entire surface of said polytetrafluoroethylene member facing said resilient resinous plastic member and received by the apertures in the surface of said resilient resinous plastic member, said projections having a density at the tip and base thereof greater than that at the midsection, each said projection having a cross-sectional dimension at the midsection which is less than that at the tip and base thereof, an adhesive interposed between the facing surfaces of said resilient resinous plastic and polytetrafluoroethylene members, said projections and apertures cooperating with said adhesive to provide a mechanical and chemical bond maintaining the facing surfaces of said members in intimate contact throughout the entire extent of facing contact thereof, a boss on the surface of said resinous plastic backing member opposite said polytetrafluoroethylene member, and means fixedly positioned within said boss to effect flexing of said diaphragm.

5. A diaphragm comprising a rubber backing member and an overlying member of polytetrafluoroethylene mechanically and adhesively bonded thereto, said polytetrafluoroethylene having a relatively low coefficient of friction and being relatively chemically inert, means defining a multiplicity of apertures in substantially the entire surface of said rubber backing member which faces said polytetrafluoroethylene member, said apertures in said rubber member having a depth less than the cross-sectional thickness dimension of said rubber backing member, a multiplicity of nibs over substantially the entire surface of said polytetrafluoroethylene member facing said rubber member and received by the apertures in the surface of said rubber member, said nibs having a density at the tip and base thereof greater than that at the midsection, each nib having a cross-sectional dimension at the midsection which is less than that at the tip and base thereof, the density of the portion of said polytetrafluoroethylene member between said nibs being greater than the density in the portion thereof overlying said nibs, an adhesive interposed between the facing surfaces of said members, said nibs and apertures cooperating with said adhesive to provide a mechanical and chemical bond maintaining the facing surfaces of said rubber and polytetrafluoroethylene members in intimate contact throughout the entire extent of facing contact thereof, a boss on the surface of said rubber member opposite said polytetrafluoroethylene member, and stud means fixedly positioned within said boss to effect flexing of said diaphragm.

6. The method of preparing a laminate of polytetrafluoroethylene and a heat curable resinous plastic, comprising the steps of compacting and sintering polytetrafluoroethylene powder material to provide a member of polytetrafluoroethylene having a multiplicity of small nibs projecting from substantially the entire face of one surface thereof, said nibs having a density at the tip and base thereof greater than that at the midsection, each said projection having a cross-sectional dimension at the midsection which is less than that at the tip and base thereof, degrading said nibbed surface of said polytetrafluoroethylene member to render it adhesive receptive, applying an adhesive over substantially the entire face of said nibbed surface, placing a body of uncured heat curable resinous plastic in contact with said adhesive coated nibbed surface of said polytetrafluoroethylene member, and applying heat and pressure to effect curing of said heat curable resinous plastic while effecting mechanical and chemical bonding thereof to said nibbed surface of said polytetrafluoroethylene member.

References Cited by the Examiner

UNITED STATES PATENTS

| 272,033 | 2/83 | Edge. |
| 2,071,921 | 2/37 | Dickson _____ 156—252 XR |
| 2,710,629 | 6/55 | Price. |
| 2,918,089 | 12/59 | McFarland. |
| 2,947,325 | 8/60 | McFarland. |
| 2,976,093 | 3/61 | Reiling _____ 156—252 |

FOREIGN PATENTS

| 13,055 | 1905 | Great Britain. |
| 793,731 | 12/55 | Great Britain. |

EARL M. BERGERT, *Primary Examiner.*

CARL F. KRAFFT, *Examiner.*

UNITED STATES PATENT OFFICE
CERTIFICATE OF CORRECTION

Patent No. 3,181,990                                May 4, 1965

Victor G. Reiling

It is hereby certified that error appears in the above numbered patent requiring correction and that the said Letters Patent should read as corrected below.

Column 1, line 14, for "performing" read -- preforming --; line 19, for "any" read -- and --; column 6, line 35, after "tha read -- at --.

Signed and sealed this 19th day of October 1965.

(SEAL)
Attest:

ERNEST W. SWIDER
Attesting Officer

EDWARD J. BRENNER
Commissioner of Patents